A. M. ALEXANDER.
SKIVING MACHINE.
APPLICATION FILED APR. 17, 1911.

1,117,541.

Patented Nov. 17, 1914.

Witnesses
Edward S. Day
Burton W. Cary

Inventor
Alexander M. Alexander
by his attorneys
Phillips, Van Etten & Fish

A. M. ALEXANDER.
SKIVING MACHINE.
APPLICATION FILED APR. 17, 1911.

1,117,541.

Patented Nov. 17, 1914.
7 SHEETS—SHEET 3.

Fig. 3.

Witnesses
Edward S. Day
Burton W. Cary

Inventor
Alexander M. Alexander
by his Attorneys
Phillips, Van Everen & Fish

Fig. 4.

A. M. ALEXANDER.
SKIVING MACHINE.
APPLICATION FILED APR. 17, 1911.

1,117,541.

Patented Nov. 17, 1914.
7 SHEETS—SHEET 6.

Witnesses
Edward S. Day
Burton W. Cary

Inventor
Alexander M. Alexander
by his Attorneys
Phillips, Van Everen & Fish

A. M. ALEXANDER.
SKIVING MACHINE.
APPLICATION FILED APR. 17, 1911.

1,117,541.

Patented Nov. 17, 1914.
7 SHEETS—SHEET 7.

Witnesses
Edward S. Day
Burton W. Cary

Inventor
Alexander M. Alexander
by his Attorneys
Phillip, Van Everen & Fish

UNITED STATES PATENT OFFICE.

ALEXANDER M. ALEXANDER, OF BEVERLY, MASSACHUSETTS, ASSIGNOR TO UNITED SHOE MACHINERY COMPANY, OF PATERSON, NEW JERSEY, A CORPORATION OF NEW JERSEY.

SKIVING-MACHINE.

1,117,541.         Specification of Letters Patent.     Patented Nov. 17, 1914.

Application filed April 17, 1911. Serial No. 621,679.

*To all whom it may concern:*

Be it known that I, ALEXANDER M. ALEXANDER, a citizen of the United States, residing at Beverly, in the county of Essex and State of Massachusetts, have invented certain new and useful Improvements in Skiving-Machines; and I do hereby declare the following to be a full, clear, and exact description of the invention, such as will enable others skilled in the art to which it appertains to make and use the same.

The present invention relates to leather skiving machines, and more particularly to machines which comprise a rotary cylindrical skiving knife, a presser foot, and a feed roll arranged to hold the leather in position and feed it against the knife.

The principal object of the invention is to simplify and improve the construction and arrangement of various parts of a machine of the class referred to, whereby its operation is rendered more certain and reliable, and whereby the various adjustments requisite for enabling the machine to operate properly in doing various classes of work may be readily and conveniently effected.

Further objects of the invention are to enable the best operative relation to be always maintained between the feed roll and the various parts of the machine coöperating therewith; to provide a casing for inclosing the various moving parts of the machine, which is arranged to allow a ready access to the interior portions of the knife when so desired; to provide a simple and efficient means for maintaining a keen edge upon the knife, which requires a minimum of power for its actuation and which is directly under the control of the operator; and to provide an improved form of presser foot by means of which the proper operative relation between the foot and the edge of the knife may always be preserved without necessitating a longitudinal adjustment of the knife each time that the cutting edge is ground away.

With these ends in view, one feature of the invention contemplates the provision, with a stationary presser foot, of a feed roll mounted upon one side of the cylindrical skiving knife and having provision for transverse adjustment relatively to the presser foot to vary the working surface of the roll. This enables any desired portion of the feed roll and presser foot to be brought into coöperative relation so that the wear on the roll may be distributed or the feed roll and presser foot may be relatively positioned to secure the best results upon the class of material being operated upon.

A further feature of the invention contemplates the separation of the base into two sections and the supporting of the feed roll upon one of the sections, which is arranged to swing away from the knife, carrying the feed roll with it and exposing the entire inner surface of the knife. In the preferred form of the invention, the driving mechanism for actuating the feed roll is arranged to be disconnected upon the movement of the feed roll into an inoperative position and to be automatically reconnected upon the return movement of the roll.

Further features of the invention contemplate the provision with a grinding disk of the usual type, of actuating mechanism, which is automatically rendered active and inactive by the movement of the grinding disk toward and from the knife, and also the provision of improved means for moving the disk into and out of operative position.

Still further features of the invention comprise certain novel features of construction, combinations and arrangements of parts hereinafter described and claimed, the advantages of which will be apparent to those skilled in the art from the following description.

The various features of the invention will be understood from the accompanying drawings and the following detailed description of the machine shown therein.

In the machine shown in the drawings, the various parts are supported upon a base which is in the form of a casing 1, the top plate of which forms a table 2 for supporting the material to be acted upon. The machine is provided with a cylindrical knife 3 mounted within the casing 1 and projecting upwardly through an opening in the table 2 into position to act upon the material. The material to be skived is presented and fed to the knife 3 by a feed roll 4 arranged within the knife and coöperating with a presser foot 5 arranged without the knife. The periphery of the feed roll is curved longitudinally to correspond to the curvature of the knife edge and the engaging face of the presser foot 5 is concave. An adjustable side gage 6 is provided for guiding the edge of the material as it is fed to the knife.

The presser foot is carried by a block 7 mounted to slide vertically in guide-ways formed in the end of an overhanging arm 8. The block 7 is supported by a spring 9 which is arranged within the upper slotted portion of the block and bears at its lower end against a thrust block 10 fastened to the arm 8 and projecting within the slotted portion of the block 7. An adjusting screw 11 engages the upper face 12 of the block 7 and by manipulating this screw, the vertical position of the presser foot with relation to the knife may be readily and conveniently adjusted. In order that the angle of the bevel may be varied as desired, the presser foot is so mounted that it may be adjusted laterally as well as vertically. Provision for conveniently securing this adjustment of the presser foot is had by mounting the presser foot in a laterally inclined guideway formed in the lower end of the block 7 and securing the presser foot in adjusted position by means of a spring pressed locking pin 13, the inner edge of which is arranged to engage in one of a series of notches formed in the back of the presser foot. In order that the best results may be secured, it is desirable that an accurate adjustment should always be maintained between the presser foot and the edge of the knife and this is obtained by providing for a relative longitudinal adjustment of the knife and presser foot. As the edge of the knife is gradually ground away when in use, and as different thicknesses of material are operated upon, a constant adjustment of the parts is necessary, and when this adjustment is obtained by a bodily axial movement of the knife and supporting shaft as a whole, it can readily be seen that a considerable amount of time and labor is involved. In the present form of the invention, this accurate adjustment is maintained in a simple and efficient manner by providing a longitudinal adjustment of the presser foot relatively to the edge of the knife. To this end, the block 7 is formed with its side faces tapering from the top to the bottom. At the upper end, the block 7 is of sufficient thickness to fit closely within the bore of the arm 8, but at its lower end there is a free space between the faces of the block and the arm sufficient to allow for all necessary longitudinal movement of the presser foot, as can readily be seen from an inspection of Figs. 1 and 5. The lower end of the block 7 is adjusted by a thumb screw 17 which bears against the rear face of the block and presents a solid abutment against which the block presses as the work is fed thereunder. The adjusting screw is retained in position by a lock nut 18 and the block is yieldingly held against the screw by a suitable spring 19.

The presser foot, when adjusted, is held in a fixed position and acts as a gage for properly presenting the work to the knife, and the material should be forced firmly and uniformly against the working surface of the presser foot by the feed roll 4. In order that the feed roll may thus support the material regardless of variations in the thickness of the material being operated upon and of variations in the adjustment of the presser foot, improved mechanism is provided for supporting the feed roll so that it may tip to change its angle with relation to the presser foot and shiving knife and may move bodily toward and from the presser foot. As shown, the feed roll is rotatably mounted upon a stud shaft 22 supported at its opposite ends in the arms 23 and 24 of the yoke-shaped head 25, and to facilitate the removal of the roll when desired, the arm 23 is detachably fastened upon the head. The head 25 is fixed at one end to a shaft 26 which is journaled in the upper end of a supporting arm 27 and in order to yieldingly retain the roll in the proper operative position, a spring 28 bears against the under face of a laterally projecting lug 29 formed upon the free end of the head 25. The upward movement of the head is limited by a pair of coacting stop faces 30 and 31 formed respectively upon the arm 27 and lug 29. The arm 27 is fixedly mounted upon a stud shaft 33 and is provided with a laterally projecting member 34 in which the lower end of the spring 28 is seated, and an initial adjustment of the spring is obtained by a screw 35, against which the lower end of the spring bears. With this construction, when pressure is applied to the surface of the roll, the spring is compressed to allow the roll to yield angularly about the shaft 26. In order that a bodily yielding movement of the roll toward and from the presser foot may be obtained, the stud shaft 33 is journaled in a carrier 37 which is rotatably mounted upon a fixed rod 38. The rod 38 is supported at its opposite ends in the sides of the base and is prevented from rotating by a pin 39. The roll and supporting parts are retained in operative position by a spring 40 which is seated in an offset portion 41 formed upon the lower part of the carrier 37. The thrust of the opposite end of the spring is supported by the base, and in order that the compression of the spring may be accurately adjusted, a screw 42 is provided, against which the end of the spring bears. The movement of the roll under the action of the spring 40 is limited by a downwardly projecting arm 43 which is fixedly mounted upon the cross rod 38. This arm is provided with an inwardly turned end 44, one face of which is arranged to contact with the adjacent face of a vertical plate 45 formed integrally with the bearing member 37, the two forming a pair of co-acting stop faces which aid in determining the normal position of the roll.

Figure 9:
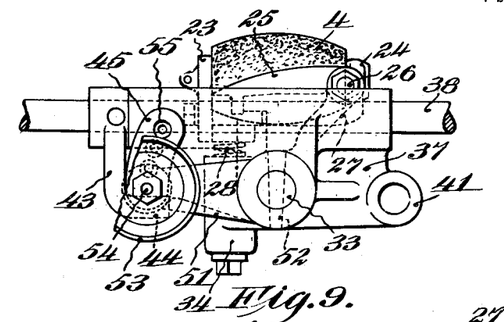
Fig. 9 is a detail illustrating a front elevation of the feed roll and supporting parts.
Figure 10:
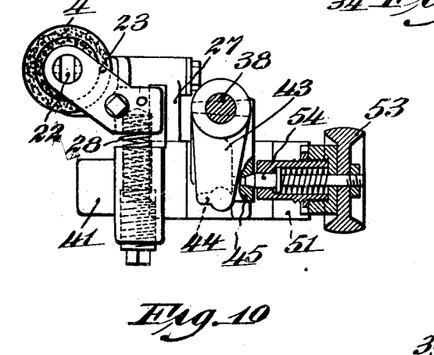
Fig. 10 is a left-hand end elevation of the same showing a sectional view of the means for retaining the feed roll in adjusted position.
Figure 11:
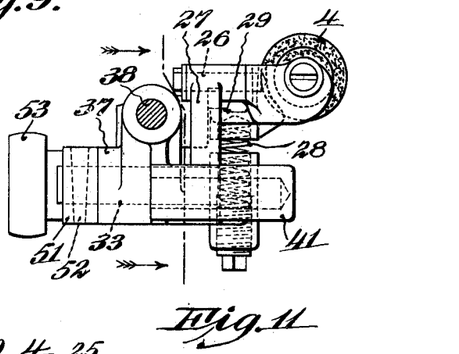
Fig. 11 is a right-hand end elevation of the same.
Figure 12:
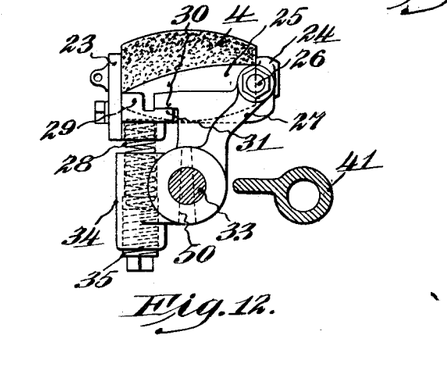
Fig. 12 is a detail showing a front elevation of the feed roll and the means for yieldingly supporting one end of the roll.

In existing machines of this type, only a small portion of the peripheral surface of the feed roll usually coöperates with the presser foot thus localizing the wear on the roll and rendering frequent renewal of the roll necessary. In accordance with one feature of the present invention, provision is made for bringing any desired portion of the feed roll into coöperative relation with the presser foot so that the wear on the roll may be distributed, or the feed roll and presser foot may be relatively positioned to secure the best results upon the class of material being operated upon. In the present embodiment of the invention this is accomplished by providing a circumferential adjustment of the feed roll relatively to the skiving knife. As stated previously, the roll supporting arm 27 is secured upon a shaft 33 which is arranged in axial alinement with the knife shaft. The arm is locked to the shaft by a taper pin 50 and a partial rotation may be imparted to the shaft by an operating arm 51 fastened to the outer end of the shaft by a taper pin 52. This arm is provided with a suitable handle 53 which serves to retain the arm in any adjusted position by means of a spring pressed detent 54 co-acting with a series of recesses 55 formed in the outer face of the plate 45. With this construction, the operator is enabled to adjust the feed roll about the axis of the shaft 33 and retain the same in any adjusted position. It may be stated that the machine is supported upon a suitable bench with one side parallel to the edge of the bench so that the front side of the machine and the front portion of the knife are the parts nearest the operator. When skiving the medium and lightest grades of work, the front portion of the cylindrical knife is employed, and by utilizing the front portion of the knife in this manner, the operator is enabled to handle and feed the work much more expeditiously. Some of the material to be skived is in the form of exceedingly small pieces and with this arrangement, it is always possible to retain hold of the piece and control the same by moving the hand along the surface of the table adjacent to the point at which the knife emerges. It is obvious that this is preferable to skiving upon the top or back portion of the knife, in which case it would be necessary for the operator to release the work when passing the same beneath the presser foot, which not only tends to prevent the formation of a perfect skiving, but necessitates loss of time in regaining possession of the work and also increases the liability of injury to the operator from the moving knife.

When the machine is used for splitting, the presser foot is arranged with its working surface concentric with the knife blade and in this case the top portion of the knife is used. As the feed roll is curved convexly upon its outer surface, with the greatest diameter at the center of the roll, it will be obvious that the surface speed of the roll at its center is greater than at the ends, and in order that a uniform feeding movement may be obtained, it is desirable that the work shall be pressed upon the central portion of the roll: otherwise there will be a tendency for one side of the work to travel faster than the other, causing a turning or twisting movement. The conditions stated above illustrate clearly the advantages of the present construction in that the roll may be adjusted for various classes of work with its central portion in each case supported beneath the presser foot so that the feeding of the work is even and uniform. A further feature of advantage in this arrangement is that when operating upon the front portion of the knife, the operator is enabled to use the yielding portion of the roll and is not compelled to use the surface of the roll in close proximity to its pivotal point, as is the case with prior constructions.

In order that the knife may be readily sharpened as occasion may require, the machine is provided with a grinding disk of the usual type, actuating mechanism which is automatically rendered active and inactive by the movement of the grinding disk toward and from the knife, and improved means under the control of the operator for moving the grinding disk into and out of operation. The construction shown in the illustrated embodiment of the invention consists of a pair of arms pivoted about a common axis and yieldingly connected together in order to normally preserve a constant angular relation. One arm carries the grinding disk upon its outer end and the second arm is operatively connected at its outer end to a driving clutch so that upon a movement of the grinder carrying arm into operative position, the clutch operating arm is actuated to engage the clutch members. To this end, a grinding disk 56 is journaled upon the outer end of an arm 57 which is pivotally supported at its opposite end upon a vertical shaft 58. A second arm 59 is also journaled upon the shaft 58 and is operatively connected at its opposite end to one member 60 of a clutch mounted to turn freely on the main driving shaft 83. The arms 57 and 59 are both provided with forked inner ends as shown clearly in Fig. 7, which provide a plurality of spaced bearing points for each arm and prevent cramping of the same upon the shaft 58. A second clutch member 61 is fastened to the main drive shaft and when the two clutch members are engaged in operative relation they serve to actuate the grinding disk 56. The grinding disk is mounted upon the upper end of a shaft 62 which carries a grooved pulley 63 upon its lower end. This pulley is driven by a suitable belt 64 from a pulley 65 formed integrally with the clutch member 60. The belt is guided in its course by a pair of suitably arranged idler pulleys 66 and 67 respectively. The rearwardly projecting portion 68 of the arm 57 is engaged by a spring 69 which normally retains the grinding disk in an inoperative position. The grinding disk is used only at intervals, and as it is desired to avoid the loss of power which is incurred through a continuous actuation of the same, means are provided by which the disk is normally disconnected from the drive shaft and automatically connected to the shaft upon movement of the grinder into an operative position. To this end, an actuating rod 70 is connected at one end to the arm 57 and is provided upon its opposite end with a knurled head 71. An arm 72 projects laterally from the arm 59 and the outer end of the arm 72 loosely surrounds the rod 70. In order to move the arm 72, upon a longitudinal movement of the actuating rod, a pair of springs 73 and 74 surround the actuating rod between the arm 57 and arm 72, and between the arm 72 and the head 75 fastened to one side of the base. The head 75 is provided with a cam face 76 which coöperates with a corresponding cam face 77 formed upon the inner side of the knurled head 71 so that by rotating the head 71 the rod 70 is moved longitudinally to draw the grinding disk 56 into operative relation with the knife. By means of the spring 73, the outer end of the arm 72 is also moved to force the clutch members 60 and 61 into operative engagement, the spring yielding to allow continued movement of the grinding disk after the clutch members have been engaged. The arrangement of the parts is such that the clutch is first engaged and then continued movement of the arm carries the grinding disk into an operative position against the knife. Upon releasing the head 71, the arm 72 is returned to its initial position by the spring 69 and the arm 72 is moved to disengage the clutch members by the spring 74. With this construction, the grinding disk and its actuating belt are normally at rest so that there is not a continuous wear upon the operating parts of the mechanism, and the actuating mechanism is thrown into operation by a movement of the disk into position to act on the knife and is thrown out of operation by the movement of the disk back to its normal inactive position.

Figures 6, 7, 8:
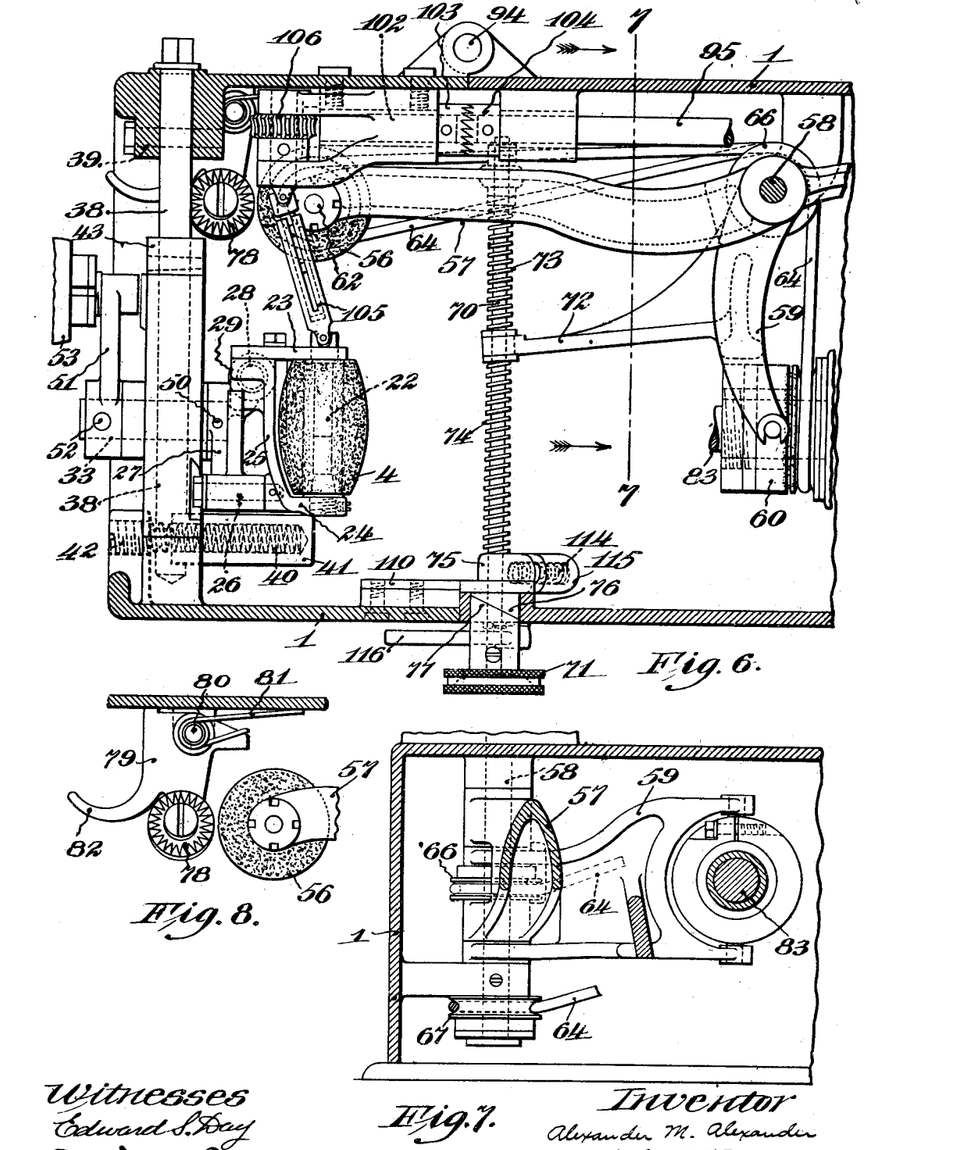
Fig. 6 is a plan view of the left-hand end of the machine showing the casing broken away and having the knife and a portion of the supporting shaft removed.
Fig. 7 is a sectional view of a detail taken upon the line 7—7 of Fig. 6 and looking in the direction of the arrows.
Fig. 8 is a detail illustrating a plan view of the resurfacing wheel arranged adjacent to the periphery of the grinding disk.

It is desirable that means be provided for conveniently resurfacing and truing up the grinding disk whenever it becomes dull or unevenly worn. In the present embodiment of the invention, these means comprise a wheel 78 which is journaled obliquely to the grinding disk upon one end of a bracket 79 pivoted at 80 to the side of the inclosing casing. The bracket is normally held in a position to retain the star wheel out of engagement with the grinding disk by means of a spring 81 and a handle 82 is provided convenient to the operator, by which the star wheel is rendered operative.

Figures 5, 14:
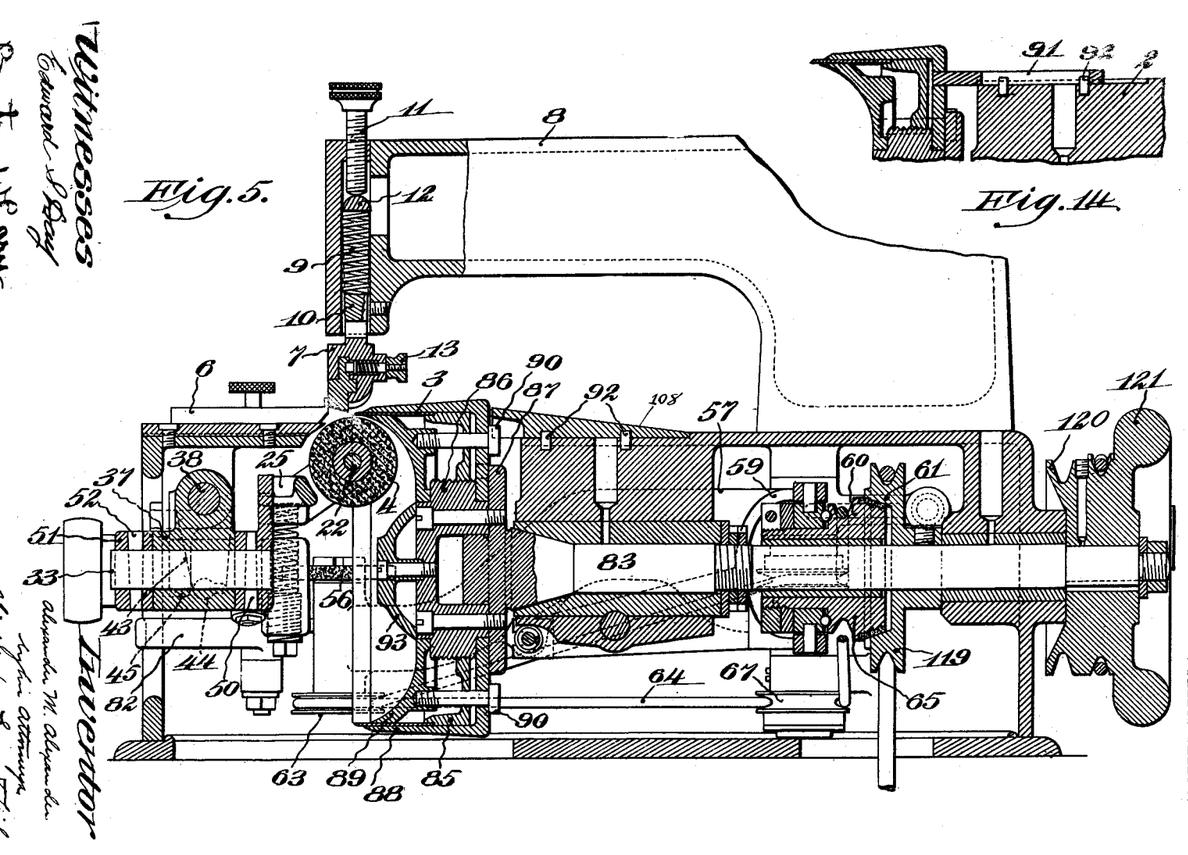
Fig. 5 is a vertical longitudinal section taken upon the line 5—5 of Fig. 3 and looking in the direction of the arrow.
Fig. 14 is a detail showing the means for locking the holder in a fixed position.

The cylindrical knife 3 is supported upon one end of the main driving shaft 83 and in order that the knife may be readily adjusted longitudinally to bring it into proper relation with the feed roll and presser foot as it is ground away, the knife shown and described in the co-pending application of applicant, No. 522,905, filed October 16, 1909, is preferably employed. The blade of the knife is formed from a thin flat band of steel which is bent into the shape of a cylinder and has one edge sharpened. The blade is adjusted axially by a ring 85 which is interiorly threaded to fit the threaded exterior of a head 86 which is secured to a flange 87 formed upon the shaft 83. The blade 3 is supported exteriorly by a cylindrical cup-shaped holder 88 which is rotatably mounted upon the inner reduced portion of the head 86 and also fits the external periphery of the adjusting ring 85. The blade is supported interiorly and clamped in adjusted position by a clamping ring 89 mounted to rotate about the outer end of the head 86 and consisting of a plurality of separate segments. Bolts 90 pass through the holder 88 and adjusting ring 85 and are threaded into the segments and serve to clamp the holder and clamping ring 89 against the head 86. In order to adjust the blade, the bolts 90 are unscrewed sufficiently to loosen the clamping ring and enable the holder and clamping ring, together with the adjusting ring 85 to be rotated relatively to the head 86. This is conveniently done in the present construction by maintaining the holder 88 stationary and rotating the shaft 83. To this end, a plurality of projecting studs 92 are arranged to engage a specially designed wrench 91 which enters a recess formed in the rear face of the holder 88 and locks the holder in a fixed position. The wrench 91 consists of a straight bar having one end formed to enter the recess and provided with a lengthwise slot adapted to seat the projecting ends of the studs 92 therein. During the operation of the machine, a suitable cover plate 108 is held in place upon the upper surface of the table by the studs 92 and this cover plate when in position projects in close proximity to the rear face of the knife and covers the projecting heads of the bolts 90. In order to eject skivings and waste material from the inner surface of the knife, the surface of the ring 89 is concave and operates to eject loose chips and dust under centrifugal action. A dome-shaped member 93 is fastened centrally to the head 86 and serves to direct the skivings from within the knife which are not ejected by centrifugal force from the surface of the ring 89. The main drive shaft 83 is supported in the usual manner in thrust bearings formed in the base and arranged to take the thrust of the knife and shaft when in operation.

Figures 1, 13:
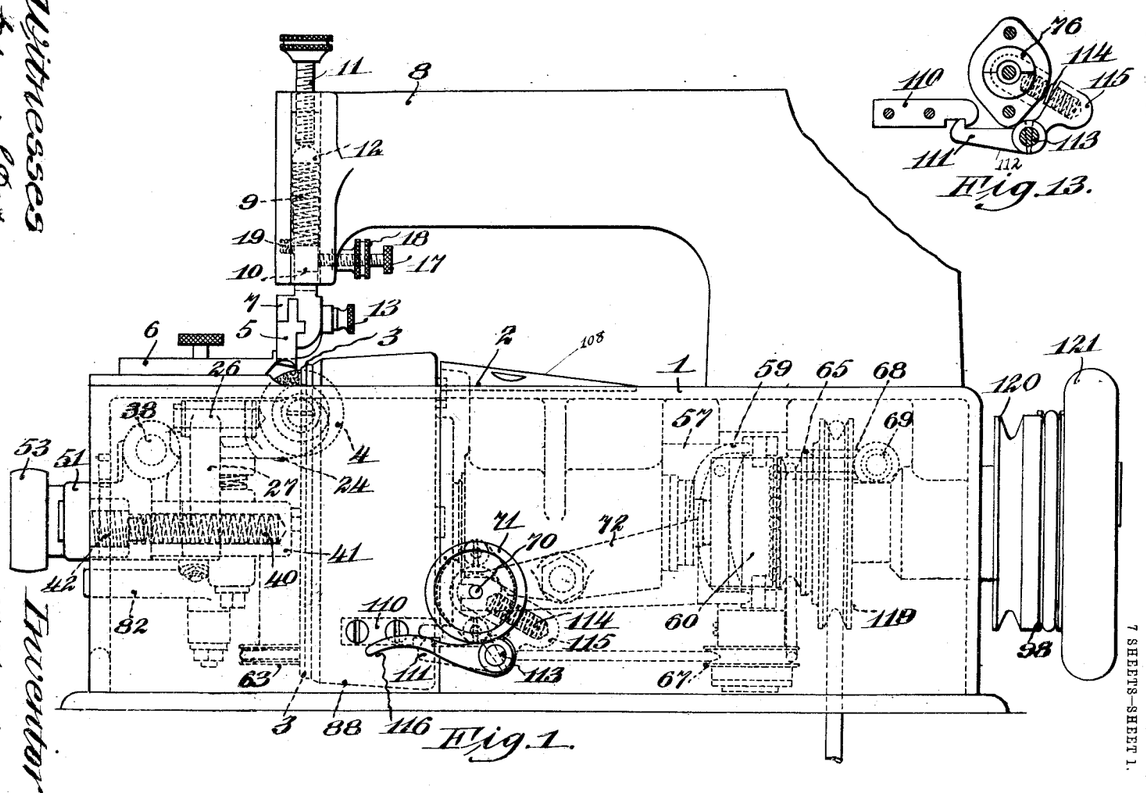
—Figure 1 is a front side elevation of the machine embodying the various features of the invention in their preferred forms.
Fig. 13 is a detail showing the latch mechanism removed from the machine.
Figure 2:
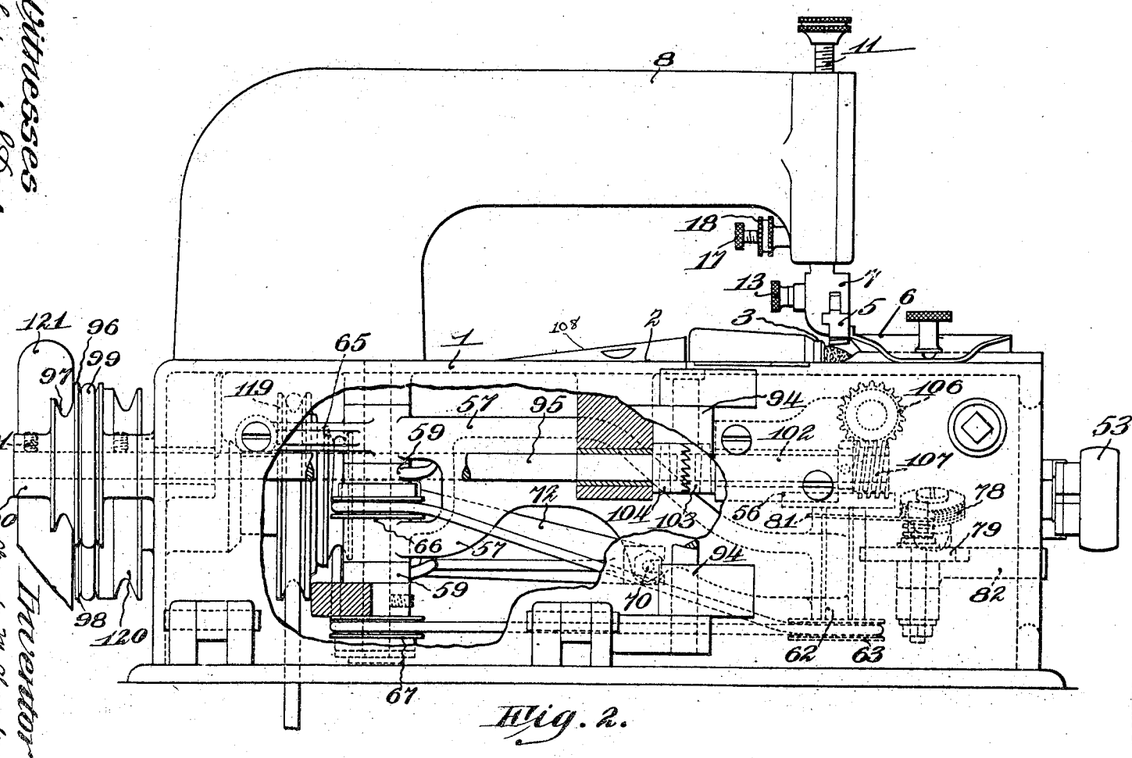
Fig. 2 is a rear side elevation of the machine with a portion of the inclosing casing broken away and showing the operating mechanism within.
Figure 3:
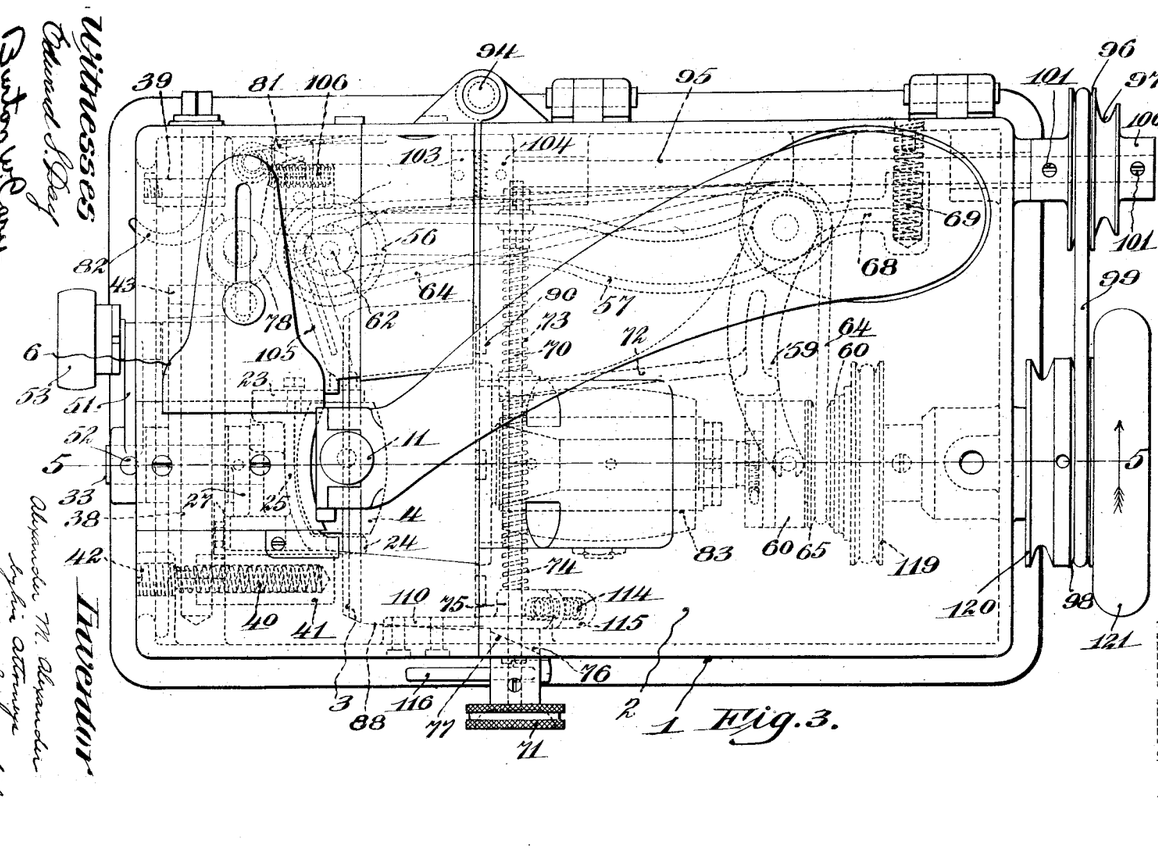
Fig. 3 is a plan view of the machine.
Figure 4:
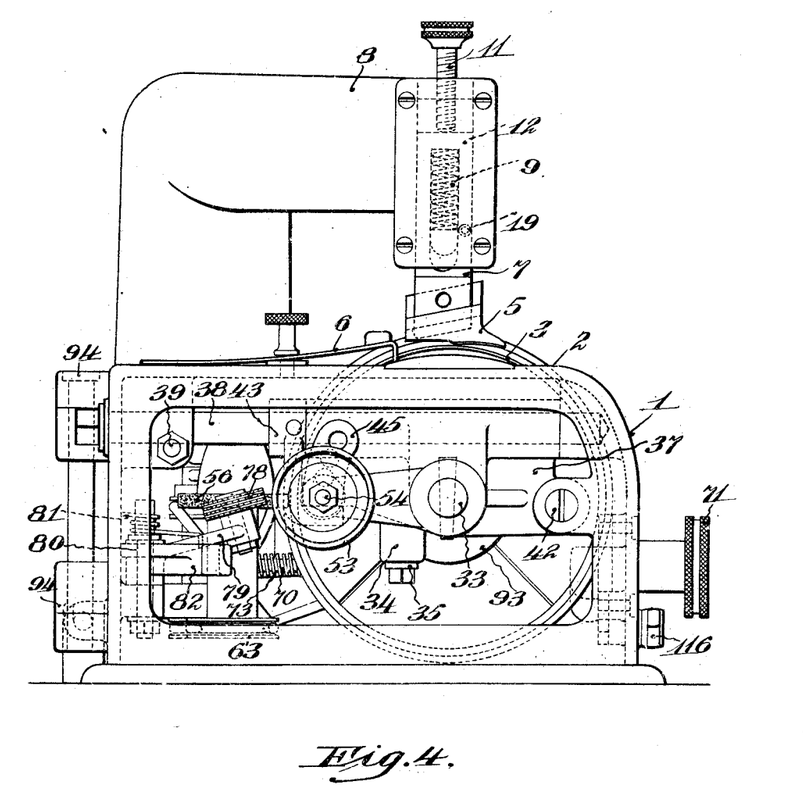
Fig. 4 is a left-hand end elevation.

In order to inclose and guard the various operating parts of the machine when in use and at the same time render certain portions of the mechanism readily accessible when necessary, the base or inclosing casing is formed in two parts which may be designated as a left and right section, and the left section is hinged at 94 to the right section. This left section carries the feed roll and supporting parts and when it is swung open, the entire inner surface of the knife is exposed and rendered conveniently accessible to the operator. As the feed roll operates continuously, means are provided for disconnecting the driving mechanism and feed roll when it is moved out of the knife into an inoperative position. The feed roll is driven by a counter shaft 95 which is journaled in the fixed portion of the casing and carries a pair of drive pulleys 96 and 97 upon its rear end. In order to readily vary the speed at which the shaft 95 is driven, the pulleys 96 and 97 are cast integrally upon a hub 100 which is detachably secured to the shaft 95 by a pair of set screws 101. By reversing the ends of the hub 100, either pulley may be positioned in alinement with the drive pulley 98 and the speed consequently varied. In the present embodiment of the invention, the drive pulley 98 is connected to the pulley 96 by a belt 99. The left portion of the inclosing casing carries a short shaft 102 which is normally in axial alinement with the shaft 95 and is operatively connected thereto by a pair of clutch faces 103 and 104 mounted upon the ends of the two shafts respectively. When the casing is closed, the clutch faces are in engagement and the shaft 102 is rotated to drive the feed roll and when the casing is opened, the clutch faces are moved out of engagement and the shaft 102 is idle. The feed roll is operatively connected to the shaft 102 through a universal joint and shaft connection 105, a worm wheel 106, and worm gear 107. In order to retain the two parts of the casing in their closed relation, a suitable latch is provided. The movable portion of the casing has a notched plate 110 fastened thereto which engages with a pivoted hook 111 supported upon the fixed portion of the casing. This hook is formed upon the end of one arm 112 of a bell crank lever fastened to a shaft 113 and the hook is retained in engagement with the notched plate by a spring 114 pressing against the second arm 115 of the bell crank. The rod 113 extends through the casing and is provided upon its outer end with an operating handle 116 and upon depressing the operating handle, the latch is unfastened and the inclosing casing may be swung out to expose the interior of the knife.

The main drive shaft 83 is conveniently actuated either from above or below the machine by the provision of a pair of pulleys 119 and 120. In the present construction, the machine is driven from below and the driving belt passes up inside of the casing and is entirely protected. An operating handle 121 is formed integral with the drive pulleys 98 and 120 and may be utilized to rotate the drive shaft by hand when desired.

While it is preferred to employ the specific construction and arrangement of parts shown and described, it will be understood that this construction and arrangement is not essential, except so far as specified in the claims, and may be changed or modified without departing from the broader features of the invention.

Having thus described the invention, what is claimed is:

1. A leather skiving machine having, in combination, a cylindrical knife, a presser foot located without the knife, and a feed roll located within the knife having provision for relative adjustment with respect to the presser foot and transversely to the direction of feed to vary the working surface of the roll, substantially as described.

2. A leather skiving machine having, in combination, a cylindrical knife, a presser foot upon one side of the knife arranged to bear rigidly upon the work, and a feed roll upon the opposite side of the knife having provision for adjustment circumferentially of the knife.

3. A leather skiving machine having, in combination, a cylindrical knife, a presser foot without the knife, a feed roll within the knife, and a support for the feed roll mounted for movement about an axis in line with the axis of the knife whereby the feed roll may be adjusted circumferentially of the knife, substantially as described.

4. A leather skiving machine having, in combination, a cylindrical knife, a presser foot without the knife, a feed roll within the knife, a head in which the feed roll is journaled, a supporting arm on which the head is pivotally supported, a shaft to which the arm is fixed, and means for partially rotating the shaft to adjust the head and feed roll circumferentially of the knife, substantially as described.

5. A leather skiving machine having, in combination, a cylindrical knife, a presser foot without the knife and a feed roll within the knife having provision for a yielding angular movement, and a yielding bodily movement relatively to the presser foot, and a bodily adjustment circumferentially of the knife, substantially as described.

6. A leather skiving machine having, in combination, a frame, a cylindrical knife, a presser foot without the knife, a feed roll within the knife, a shaft about which the roll is arranged to yield angularly, a support for the shaft, a rod upon which the support is journaled, a pair of co-acting stops mounted upon the support and rod, and a spring supported between the frame and support and arranged to retain the stops in engagement, substantially as described.

7. A leather skiving machine having, in combination, a cylindrical knife, a presser foot without the knife, a feed roll within the knife, arranged to yield angularly in the plane of the knife edge, and means for securing a bodily circumferential adjustment of the feed roll relative to the knife while maintaining the surface of the roll in concentric relation to the knife edge, substantially as described.

8. A leather skiving machine having, in combination, a cylindrical knife, a presser foot without the knife, a feed roll within the knife, an arm pivotally supporting the feed roll at one end, a spring mounted upon the arm and arranged to yieldably support the feed roll at the opposite end, and a shaft supporting the arm and arranged to be partially rotated to adjust the feed roll circumferentially of the knife, substantially as described.

9. A leather skiving machine having, in combination, a skiving knife, a feed roll located at one side of the knife, a presser foot located upon the opposite side of the knife, a grinding disk movable into and out of operative engagement with the knife, a drive shaft, a clutch for operatively connecting the drive shaft to the grinding disk, and means for engaging the clutch when the disk is moved into operative position, substantially as described.

10. A leather skiving machine having, in combination, a skiving knife, a feed roll located at one side of the knife, a presser foot located upon the opposite side of the knife, a pair of arms, a grinding disk on one arm, a clutch member connected with the other arm, a second clutch member, and means connecting the two arms whereby upon movement of the grinder into operative position the clutch members are engaged, substantially as described.

11. A leather skiving machine comprising a cylindrical knife, a pair of arms, a shaft upon which the arms are journaled, a grinding disk on one arm, a clutch member connected to the other arm, a yielding connection between the arms, and means under the control of the operator for moving the grinding disk into and out of operative position, substantially as described.

12. A leather skiving machine comprising a cylindrical knife, a grinder carrying arm and a clutch operating arm pivoted to turn about a common axis, an actuating rod connected to the first mentioned arm, an arm extending laterally from the clutch operating arm and loosely engaging the actuating rod and a pair of springs surrounding the actuating rod upon each side of the laterally extending arm and arranged to yieldingly move the arm upon a longitudinal movement of the actuating rod, substantially as described.

13. A leather skiving machine comprising a cylindrical knife, a grinder carrying arm and a clutch operating arm pivoted about a common axis, an actuating rod connected to the first mentioned arm, operative connections between the actuating rod and second arm, a head provided with a cam face mounted upon the outer end of the actuating rod, and a block with a corresponding cam face fixedly supported adjacent thereto, whereby upon a rotation of the head the actuating rod is moved in the direction of its length, substantially as described.

14. A leather skiving machine having, in combination, a cylindrical knife, a feed roll within the knife, a presser foot without the knife, a head in which the feed roll is journaled, and means for supporting the head arranged to swing to and from the knife and carry the head therewith to remove the feed roll out of the knife into a position at one side of the knife when desired, substantially as described.

15. A leather skiving machine having, in combination, a cylindrical knife, a feed roll within the knife, a presser foot without the knife, and an inclosing casing having two sections and arranged to allow one of the sections carrying the feed roll to be removed from the immediate vicinity of the knife, exposing the entire inner surface of the same, substantially as described.

16. A leather skiving machine having, in combination, a cylindrical knife, a presser foot without the knife, a feed roll within the knife, and means for positively actuating the feed roll arranged to be disconnected upon movement of the feed roll from within the knife, substantially as described.

17. A leather skiving machine having, in combination, a cylindrical knife, a presser foot without the knife, a feed roll within the knife, an inclosing casing having a left and right section hinged together, the left section carrying the feed roll, a counter shaft journaled in the right section, a second shaft journaled in the left section and operatively connected to the feed roll, and a pair of clutch faces mounted upon the adjacent ends of the two shafts, substantially as described.

18. A leather skiving machine having, in combination, a cylindrical knife, a feed roll within the knife, a presser foot without the knife, an arm, a block supported in the arm, and having its side faces tapering from top to bottom in order to afford a free space between the faces of the block and arm, and means for adjusting the block relatively to the arm, whereby the presser foot is adjusted longitudinally, substantially as described.

19. A leather skiving machine having, in combination, a cylindrical knife, a feed roll within the knife, a presser foot without the knife, an arm, a block supported in the arm, and having its side faces tapering from top to bottom in order to afford a free space between the faces of the block and arm, an adjusting screw bearing against the lower end of the block, and means for yieldingly retaining the block against the screw, substantially as described.

20. A leather skiving machine having, in combination, a cylindrical knife, a presser foot without the knife, a feed roll within the knife, means for actuating the knife, and a member projecting outwardly into the interior of the knife and provided with a convex surface to direct skivings out of the knife, substantially as described.

21. A leather skiving machine comprising a cylindrical knife blade, a knife supporting shaft, a blade adjusting ring threadedly connected thereto, a knife holder, means for securing the holder and blade adjusting ring against relative rotation, an inclosing casing, studs projecting from the upper surface of the inclosing casing, and a wrench engaging the studs and holder to lock the holder in a fixed position, substantially as described.

22. A leather skiving machine comprising a cylindrical knife blade, a knife supporting shaft, a blade adjusting ring threadedly connected thereto, a knife holder, means for securing the holder and blade adjusting ring against relative rotation, and means for locking the holder in a fixed position in order to adjust the knife blade longitudinally, substantially as described.

23. A leather skiving machine having, in combination, a cylindrical knife, a presser foot supported upon one side of the knife, and a feed roll supported upon the opposite side of the knife and coöperating with the presser foot, one of the members having provision for a yielding angular movement and a yielding bodily movement to and from the coöperating member and a bodily adjustment circumferentially of the knife, substantially as described.

24. A leather skiving machine having, in combination, a cylindrical knife, a presser foot supported upon one side of the knife, and a coöperating feed roll supported upon the opposite side of the knife, the feed roll having provision for adjustment in a curved path to adjust the member circumferentially of the knife while maintaining the surface of the roll in concentric relation to the knife edge, substantially as described.

25. A leather skiving machine having, in combination, a cylindrical knife, a presser foot supported upon one side of the knife, a feed roll supported upon the opposite side of the knife, and a support for one of the members mounted for movement about an axis in line with the axis of the knife whereby the member may be adjusted circumferentially of the knife, substantially as described.

26. A leather skiving machine having, in combination, a cylindrical knife, a presser foot, and a feed roll supported upon opposite sides of the knife and arranged to guide and feed the work to the knife, a concave guard on the inside of the knife and a dome-shaped member supported centrally of the guard and projecting into the interior of the knife to direct skivings out of the knife, substantially as described.

27. A leather skiving machine having, in combination, a cylindrical knife, a presser foot upon one side of the knife, a feed roll upon the opposite side of the knife, and means for securing a circumferential movement of the feed roll relative the knife with a single adjustment, substantially as described.

ALEXANDER M. ALEXANDER.

Witnesses:
ELMER B. GRUSH,
NORMAN C. HUSSEY.